Aug. 17, 1965
C. VOORHIES
3,200,931
AUTOMATIC HANDLING OF MAGNETIC PARTS
Filed Dec. 20, 1962
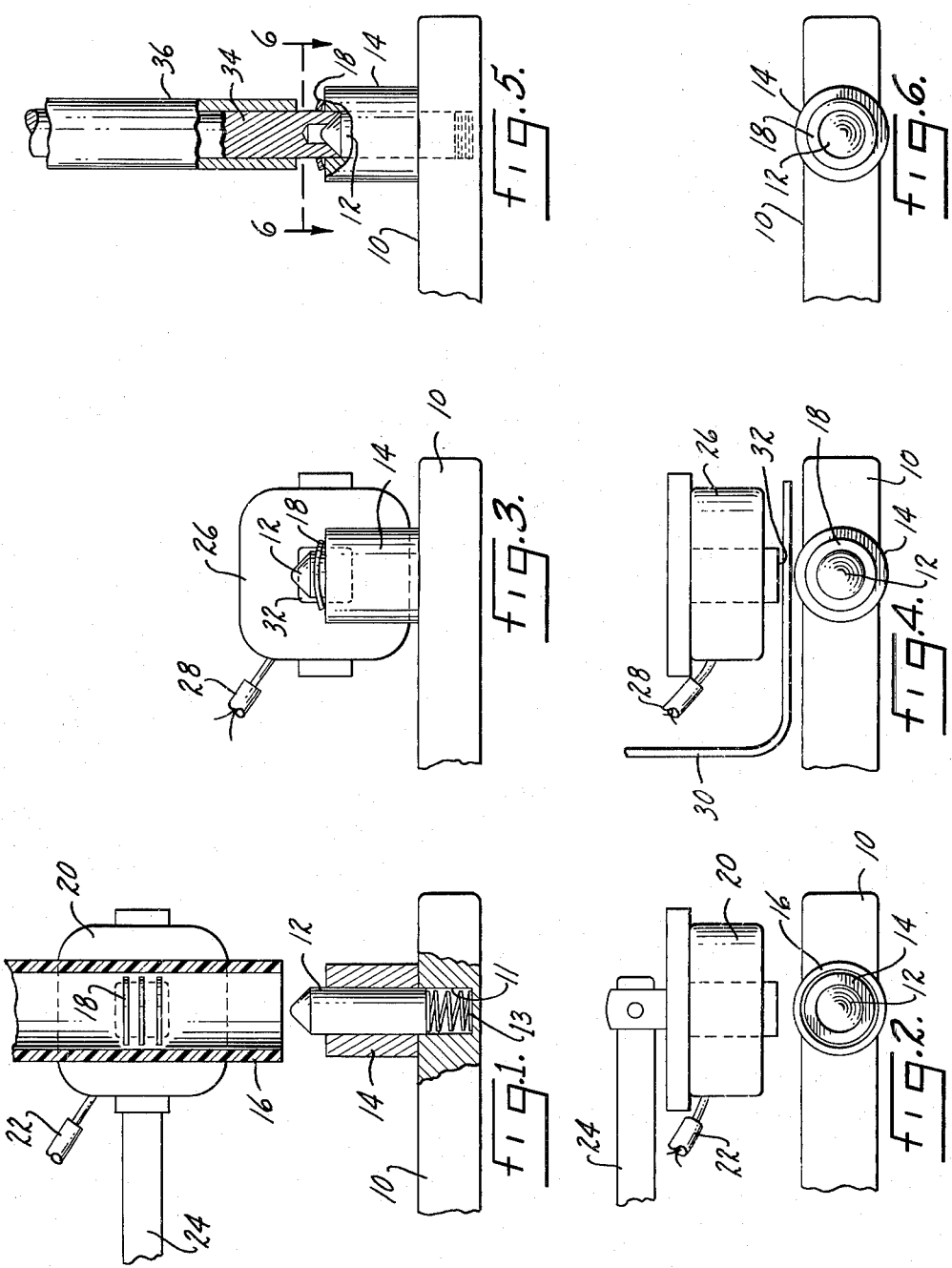
INVENTOR.
Carl Voorhies,
BY Parker & Carter
Attorneys.

United States Patent Office 3,200,931
Patented Aug. 17, 1965

3,200,931
AUTOMATIC HANDLING OF MAGNETIC PARTS
Carl Voorhies, 2505 N. Villa Lane, McHenry, Ill.
Filed Dec. 20, 1962, Ser. No. 246,196
3 Claims. (Cl. 198—35)

This invention relates to a method and apparatus for magnetically separating small parts.

One purpose of the invention is a method of separating small like parts in which a single part remains in a predetermined position after separation.

Another purpose is a method of magnetic separation of parts in which the parts are magnetized so that they repel each other, a single part remaining in position.

Another purpose is an apparatus for magnetically separating like parts.

Other purposes will appear in the ensuing specification, drawings and claims.

The invention is illustrated diagramatically in the following drawings wherein:

FIGURE 1 is a side view of an apparatus for loading parts into a stack, with parts in section, FIGURE 2 is a top plan view of the apparatus in FIGURE 1, FIGURE 3 is a side view of an apparatus for causing the stacked parts to magnetically separate, with parts removed, FIGURE 4 is a top plan view of the apparatus in FIGURE 3, FIGURE 5 is a side view of an apparatus for removing the bottom part in the stack, with parts in section, and FIGURE 6 is a top plan view taken on line 6—6 of the apparatus shown in FIGURE 5.

This invention utilizes the known principle that areas having the same magnetic polarity repel one another. This principle is utilized in separating small parts which are first magnetized so that adjacent areas of the parts have the same magnetic polarity.

Considering FIGURE 1, a slide or conveyor 10 mounts a small pin 12 a major portion of which may be enclosed by a sleeve or the like 14. The pin 12 extends down into an aligned bore 11 in the slide 10 where a spring 13 biases the pin to an outward position. Directly above the pin and sleeve is a hollow tube 16 which is preferably formed of a non-magnetic material. Glass or plastic are satisfactory materials.

Washers, indicated at 18, or some other small part formed of a magnetic material, may be fed through the top of the tube 16 either by a suitable conveyor, not shown, or by hand. What is important is that there be a relatively constant, although not heavy, flow of the parts to be separated to the top of the tube 16.

Adjacent the tube 16 is a magnet 20 which is preferably an electromagnet, fed by wire 22, and activated by A.C. current. It is important that the parts within the tube not be permanently magnetized which accounts for the use of A.C. current in the magnet. The magnet 20 is mounted on a swingable arm 24 which is effective to pivot the magnet toward and away from the non-magnetic tube 16.

When the magnet is in the position shown, and assuming that it is an electromagnet, and electric power is applied, a magnetic field will hold the washers 18 in a fixed position within the tube 16. It will separate the washers. The washers will be separated because those areas of the washers adjacent the magnet will assume one polarity and the opposite side of the washers will assume the other polarity. Like areas of adjacent washers will have the same polarity and these parts will repel one another. Once the magnetic field is removed from adjacent the tube 16, either by shutting off the electric power or by pivoting the magnet away from the tube, the washers 18 are free to drop down on the pin 12. It is preferred that the number of washers on the pin not exceed, for example 6. However, this is not a limitation. What is important is to provide a small number of washers on the pin 12.

After the pin 12 has been loaded with washers or some other part, the conveyor 10 moves, by means not shown and not important to the invention, by a second magnet 26. The magnet 26 is preferably an electromagnet fed with A.C. current through wires 28. Positioned between the magnet and the conveyor 10 is an arm 30 which pivots or otherwise moves in a manner to separate any washers which have been attracted to and held to the magnet 26. Again it is important not to permanently magnetize the washers.

In operation, a magnetic field will be applied by the magnet 26 to the stack of washers on the pin 12. Those areas of the washers adjacent the magnet will have one polarity while those areas on the opposite side of the washer will have the opposite polarity. Like areas of adjacent washers will have the same polarity and therefore the washers will repel one another. All but the bottom washer will be driven upwardly or in an axial direction and off the pin. The washers are fixed in a lateral direction by the pin but are free to move longitudinally or axially. The bottom washer remains because there is nothing to repel it. As the washers are repelled or driven off of the pin they will be attracted to the magnet. At this time the arm 30 may be used to sweep along the front edge 32 of the magnet to remove the washers. The washers will then fall down and may be picked up by a suitable conveyor and taken back where they may be again run through the separation process.

The washers are removed from the pin 12 while the pin is moving. The conveyor 10 will then position the pin 12 at a third station shown in FIGURES 5 and 6. At the third station the single washer remaining on the pin may be removed from the pin in any suitable manner. What is important in the invention is to have a single washer remaining on the pin. The invention is directed to separating the washers so that only a single washer remains and this washer may be then moved to a point of use. As shown in FIGURES 5 and 6 a shaft 34 may be positioned for reciprocation above the pin 10. Downward movement of the shaft 34 is effective to drive the pin 12 down through the sleeve 14 and into the conveyor 10. As the shaft 34 moves down it will pass through the central hole in the washer 18 and because the washer is curved it will hold the washer. A sleeve 36 may be positioned on the outside of the shaft 34 and is effective to strip off the washer at a later time.

Normally in a machine of this type once the washer is on the shaft 34, the shaft and sleeve 36 will be indexed to a position where the washer is to be used. An important use for the invention shown is in assembling hydraulic tappets. There are many small parts in the tappet and it is very expensive as well as time consuming to assemble these parts by hand. In addition, at times, these parts may stick to each other and more than one washer may be placed in a tappet. This of course may cause the tappet to malfunction. By magnetically separating all the parts it is assured that only one part of each type will be placed within the tappet housing.

The present invention may be included within an overall tappet assembly machine, although the machine itself is not illustrated. The machine will automatically and sequentially move the slide 10 from one position to the next and will coordinate this movement with other assembly operations.

The invention should not be limited to any particular part, as any small part which may be formed of magnetic material and stacked, may be separated in the manner described. In addition, parts larger than those illustrated may be separated, providing sufficient magnetic force is available.

Whereas the preferred form of the invention has been shown and described herein, it should be realized that there are many modifications, substitutions and alterations thereto within the scope of the following claims.

I claim:

1. A method of separating a single part formed of a magnetic material from like parts, including the steps of stacking said parts, one upon the other, in a fixed lateral position, forming a magnetic field along one side of the stacked parts so that each part assumes one magnetic polarity along the side adjacent the magnetic field and the opposite polarity along its other side whereby said parts repel one another, the magnetic field moving the repelled parts axially away from the bottom part in the stack and therefore into a fixed position in the magnetic field, removing said parts from the fixed position in said magnetic field, and subsequently removing the bottom part in the stack and conveying it to a point of use.

2. The method of claim 1 further characterized by and including the step of limiting the number of parts included in the stack.

3. In a means for separating small washers and the like formed of a magnetic material, means for stacking said washers, one upon the other, in a fixed lateral position, including a pin of a size to receive said washers, yielding means urging said pin in one direction, a sleeve concentric with said pin, said pin being movable within said sleeve, means for forming a magnetic field along one side of said stacked washers so that each of the washers assumes one magnetic polarity along the side adjacent the magnetic field and the opposite polarity at its other side, whereby said washers repel each other, with the bottom washer in the stack remaining in position on the pin, and the other parts being repelled off the pin.

References Cited by the Examiner

UNITED STATES PATENTS 2,795,340   6/57   Hommel _____ 221—175 X
2,999,687   9/61   Hommel.

FOREIGN PATENTS 717,326   8/51   Great Britain.

SAMUEL F. COLEMAN, *Primary Examiner.*

EDWARD A. SROKA, *Examiner.*